US008717768B2

(12) United States Patent
Tu et al.

(10) Patent No.: US 8,717,768 B2
(45) Date of Patent: May 6, 2014

(54) ELECTRONIC DEVICE WITH CABLE

(75) Inventors: Chen-Ruei Tu, Tu-Cheng (TW);
Shu-Hsien Chou, Tu-Cheng (TW);
Li-Ping Chen, Tu-Cheng (TW)

(73) Assignee: Hon Hai Precision Industry Co., Ltd.,
New Taipei (TW)

( * ) Notice: Subject to any disclaimer, the term of this patent is extended or adjusted under 35 U.S.C. 154(b) by 416 days.

(21) Appl. No.: 13/089,499

(22) Filed: Apr. 19, 2011

(65) Prior Publication Data

US 2012/0063105 A1 Mar. 15, 2012

(30) Foreign Application Priority Data

Sep. 9, 2010 (CN) .......................... 2010 1 0277240

(51) Int. Cl.
*H05K 5/00* (2006.01)
(52) U.S. Cl.
USPC ...... 361/732; 361/736; 361/730; 361/679.02; 361/825; 174/79; 174/99 R
(58) Field of Classification Search
USPC ......................................... 361/732, 736, 730
See application file for complete search history.

(56) References Cited

U.S. PATENT DOCUMENTS

| 3,787,016 | A  | * | 1/1974 | Laval, Jr. ........................... 248/49 |
| 6,009,223 | A  | * | 12/1999 | Arizpe ............................ 385/134 |
| 6,452,793 | B1 | * | 9/2002 | Boe ........................... 361/679.33 |
| 6,522,547 | B1 | * | 2/2003 | Diaz et al. ...................... 361/724 |
| 2005/0067358 | A1 | * | 3/2005 | Lee et al. ......................... 211/26 |
| 2005/0276015 | A1 | * | 12/2005 | Wong ............................ 361/687 |
| 2006/0158842 | A1 | * | 7/2006 | McAnally et al. ............ 361/686 |
| 2007/0031102 | A1 | * | 2/2007 | McNutt et al. ................ 385/135 |
| 2009/0261214 | A1 | * | 10/2009 | Beauchamp et al. ........ 248/74.1 |

* cited by examiner

*Primary Examiner* — Tuan T Dinh
*Assistant Examiner* — Steven T Sawyer
(74) *Attorney, Agent, or Firm* — Novak Druce Connolly Bove + Quigg LLP

(57) ABSTRACT

An electronic device includes a chassis, a bracket received in the chassis and a cable. A storage device is received in the bracket, and a wire is connected to the storage device. A motherboard is attached to the chassis, and at least two inserting slots are located on the motherboard. A first circuit board is electronically connected to the wire. The cable is electronically connected to the first circuit board and includes a connecting component and at least two connectors. The connecting component is electronically connected to the first circuit board, and the at least two connectors are electronically connected to the at least two inserting slots.

10 Claims, 5 Drawing Sheets

ELECTRONIC DEVICE WITH CABLE

BACKGROUND

1. Technical Field

The present disclosure relates to an electronic device.

2. Description of Related Art

Electronic storage devices are electronically connected to a motherboard in an electronic device by a plurality of electronic components, such as a connector, a backboard, and a transferring circuit board. So many electronic components make design and assembly complicated and lowers efficiency of the assembly process.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
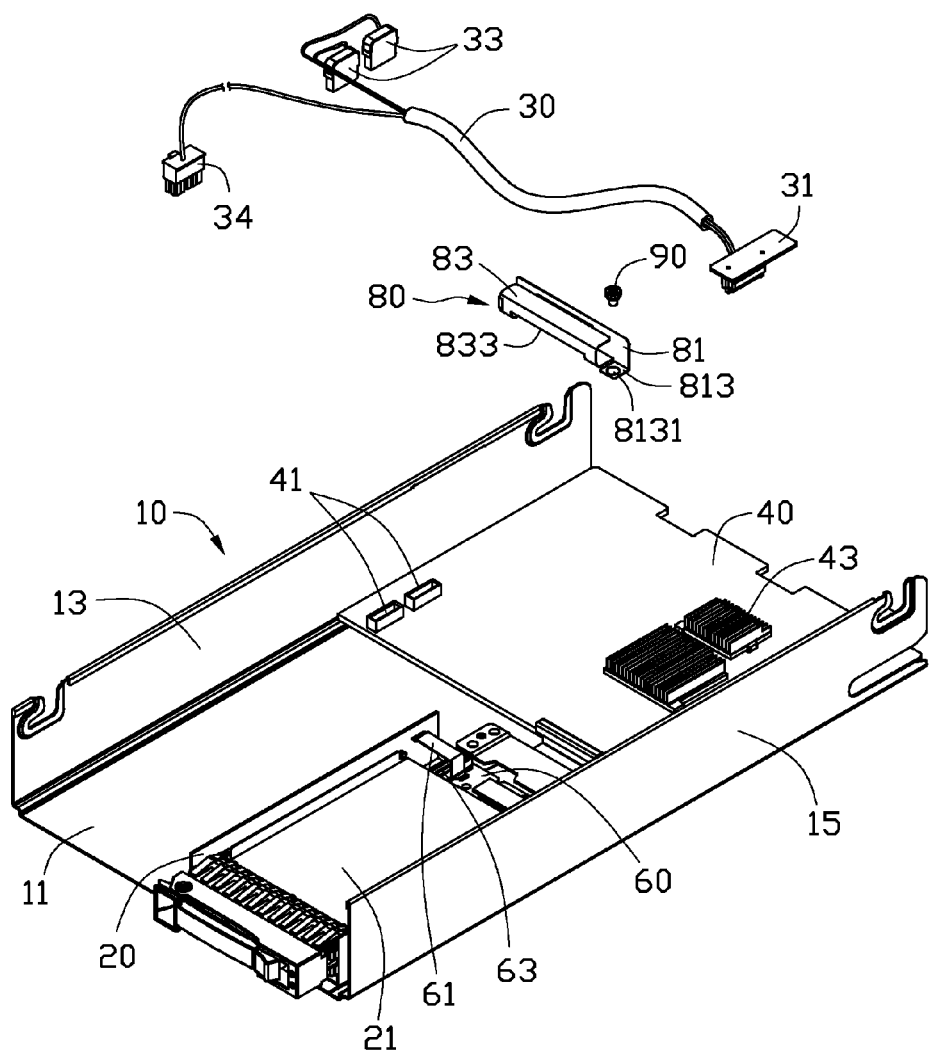
FIG. 1 is an exploded, isometric view of an electronic device in accordance with an embodiment.
Figure 2:
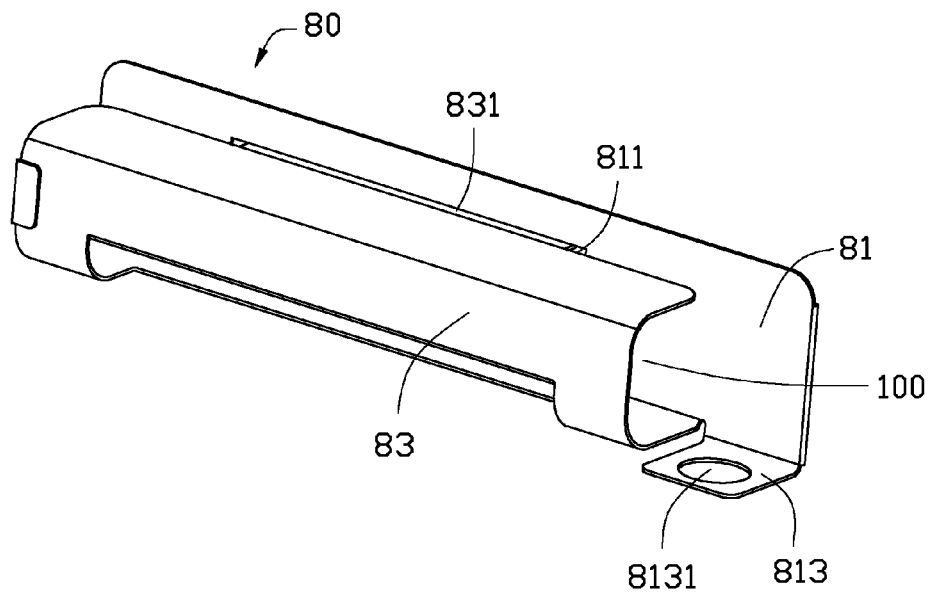
FIG. 2 is an isometric view of a clamping member of the electronic device in accordance with an embodiment.
Figure 3:
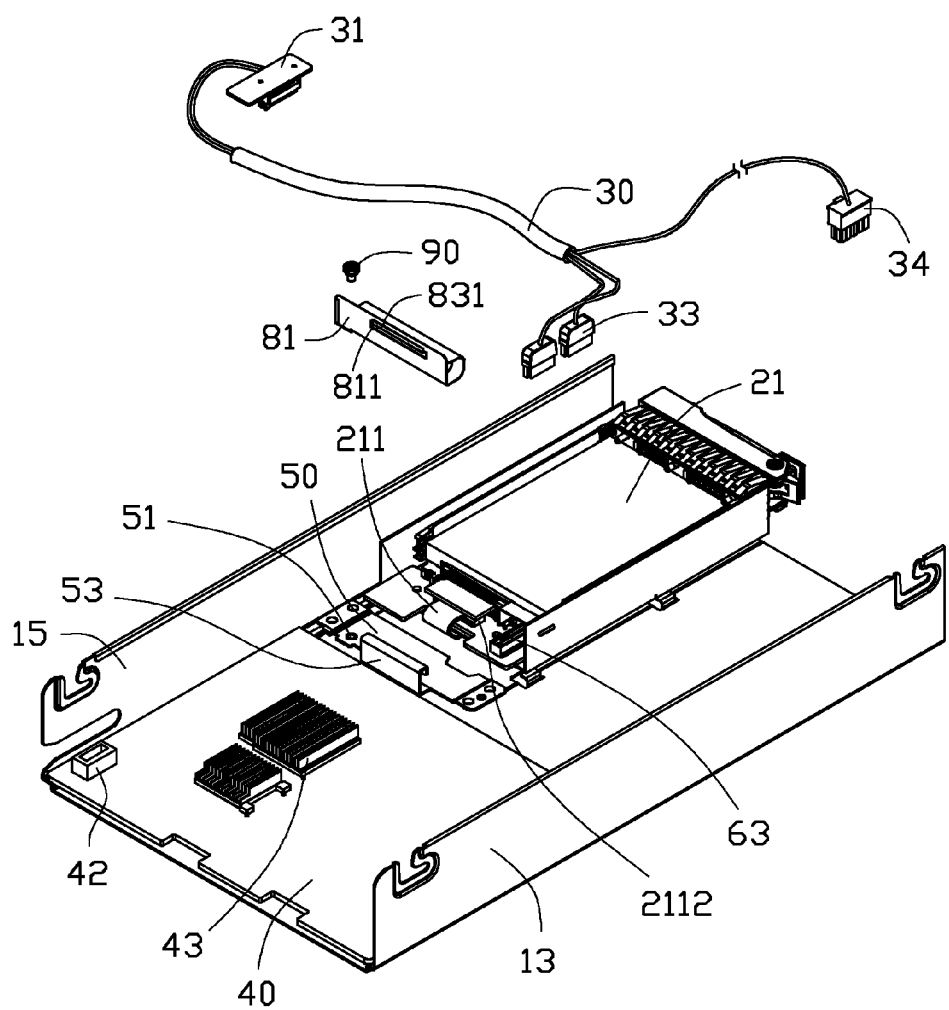
FIG. 3 is similar to FIG. 1, but from a different aspect.

Referring to FIGS. 1 and 3, an electronic device in accordance with an embodiment includes a chassis 10, a bracket 20 received in the chassis 10, and a cable 30 configured for transmitting signals.

The chassis 10 includes a bottom plate 11, a first side plate 13, and a second side plate 15. In one embodiment, the first side plate 13 and the second side plate 15 are substantially parallel to each other and perpendicular to the bottom plate 11.

A motherboard 40, a supporting member 50, and a first circuit board 60 are attached to the bottom plate 11. The supporting member 50 is located between the motherboard 40 and the first circuit board 60. Two first inserting slots 41 and a second inserting slot 42 (shown in FIG. 3) are defined on the first circuit board 60, and two heat dissipating devices 43, adjacent the second inserting slot 42, are attached to the first circuit board 60. In one embodiment, the two first inserting slots 41 are near to the first side plate 13, and the second inserting slot 42 is near to the second side plate 15. A securing hole 51, adjacent to the second side plate 15, is defined in the supporting member 50, and a clipping piece 53, near to the first circuit board 60, is connected to the supporting member 50. An abutting piece 61 is located between the first circuit board 60 and the bracket 20. A socket 63 is defined in the first circuit board 60 below the abutting piece 61.

A clamping member 80 is located between the supporting member 50 and the first circuit board 60 and secures the cable 30. The clamping member 80 includes a main body 81, a clasping plate 83 connected to the main body 81, and a mounting piece 813 adjacent to the clasping plate 83. A receiving hole 811 is defined in the main body 81. A clasping portion 831 extends from the clasping plate 83, for being engaged in the receiving hole 811, so that the main body 81 and the clasping plate 83 cooperatively define an accommodating space 100 for receiving the cable 30. A mounting hole 8131 is defined in the mounting piece 813, corresponding to the securing hole 51 of the supporting member 50.

Referring to FIG. 3, the bracket 20 is near to the first circuit board 60, and a storage device 21 is received in the bracket 20. A wire 211 is connected to the storage device 21, and a connector 2112 is electronically connected to the wire 211 and the first circuit board 60.

A connecting component 31 is secured to a first end of the cable 30, and configured to plug into the socket 63. Two first connectors 33 are configured to insert into the two first inserting slots 41, and a second connector 34 is configured to insert into the second inserting slot 42. The two first connectors 33 and the second connector 34 are connected to a second end of the cable 30.

Figure 4:
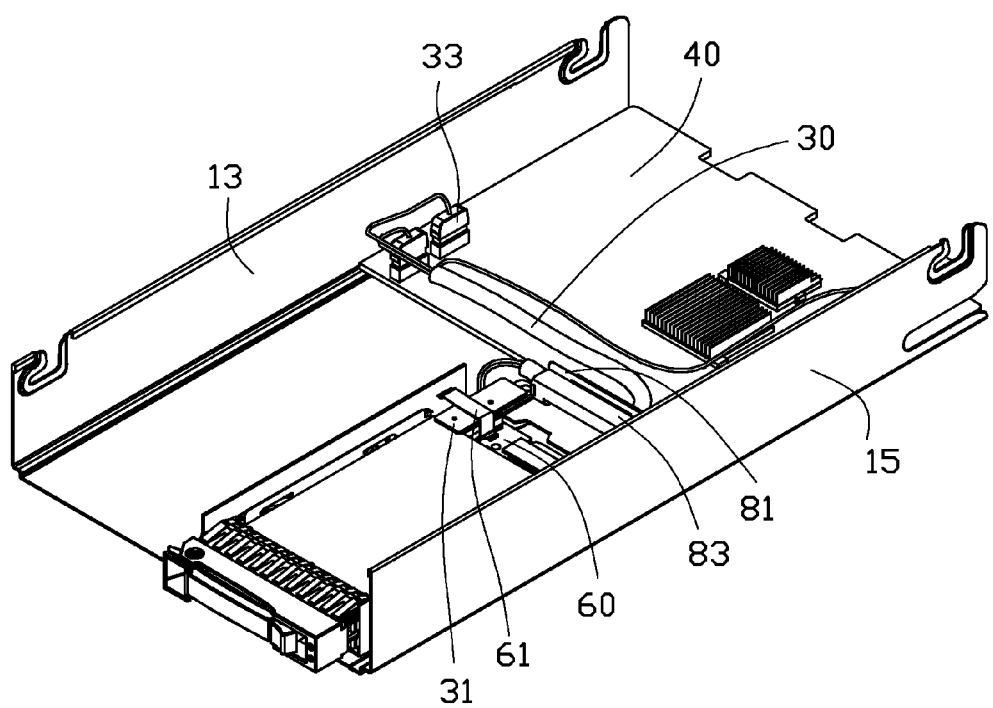
FIG. 4 is an assembled view of FIG. 1.
Figure 5:
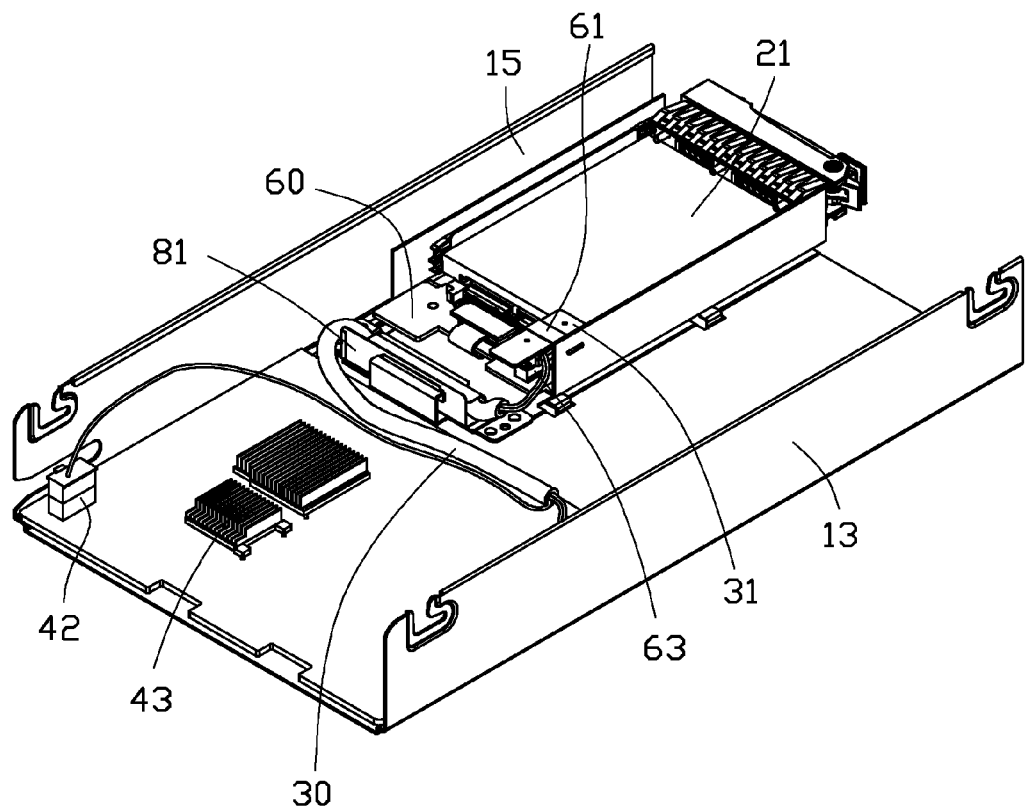
FIG. 5 is an assembled view of FIG. 3.

Referring to FIGS. 4-5, in assembly, the wire 211 of the storage device 21 is electronically connected to the first circuit board 60. The clamping member 80 is placed on the supporting member 50, and the main body 81 of the clamping member 80 abuts the clipping piece 53. The mounting hole 8131 of the mounting piece 813 is aligned with the securing hole 51 of the supporting member 50. A fixing member 90, such as a screw, is engaged in the mounting hole 8131 and the securing hole 51, to secure the clamping member 80 to the supporting member 50. At this point the clasping portion 831 is disengaged from the receiving hole 811 of the main body 81 and abuts the main body 81.

The connecting component 31 of the cable 30 is plugged into the socket 63. The cable 30 is located between the clasping plate 83 and the main body 81. The clasping portion 831 is pressed towards the receiving hole 811 and deformed to pass through the receiving hole 811, and released to rebound, thus clipping into the receiving hole 811. Therefore, the cable 30 is received in the accommodating space 100 defined by the clasping plate 83 and the main body 81. The two first connectors 33 of the cable 30 are pulled towards the two first inserting slots 41 for being engaged therein. The second connector 34 of the cable 30 is pulled towards the second inserting slot 42 for being engaged therein. So, the assembly is completed.

In use, a signal from the storage device 21 is transmitted to the first circuit board 60 via the wire 211, and the signal further transmitted to the cable 30 via the first circuit board 60. Then, the signal can be transmitted to the motherboard 40 via the first and second connectors 33, 34. Therefore, the signal can be transmitted between storage device 21 and the motherboard 40.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. An electronic device comprising: a chassis;
   a bracket received in the chassis, a storage device received in the bracket, a wire connected to the storage device;
   a motherboard attached to the chassis, at least two inserting slots are located on the motherboard;

a first circuit board electronically connected to the wire;

a supporting member located between the motherboard and the first circuit board; the supporting member comprising a clipping piece, a clamping member located between the supporting member and the first circuit board; the clamping member comprises a main body; and the main body abuts the clipping piece; and a cable, electronically connected to the first circuit board, comprising a connecting component and at least two connectors, the connecting component is electronically connected to the first circuit board, and the at least two connectors are electronically connected to the at least two inserting slots, wherein the clamping member is located between the motherboard and the first circuit board, and the cable is received in the clamping member and wherein the clamping member further comprises a clasping plate connected to the main body, and the main body and the clasping plate cooperatively define an accommodating space configured for positioning the cable.

2. The electronic device of claim 1, wherein a receiving hole is defined in the main body, and a clasping portion, engaged in the receiving hole, extends from the clasping plate.

3. The electronic device of claim 1, wherein the clamping member further comprises a mounting piece, and the supporting member is configured for being secured to the mounting piece.

4. The electronic device of claim 1, wherein a socket is defined in the first circuit board, and the connecting component is engaged in the socket.

5. The electronic device of claim 4, wherein an abutting piece is located above the socket, and the abutting piece abuts the connecting component.

6. An electronic device comprising:

a chassis comprising a bottom plate, a first side plate and a second side plate substantially parallel to the first side plate, a motherboard and a first circuit board attached to the bottom plate, at least two inserting slots are defined in the motherboard; a bracket, abutting the second side plate, received in the chassis, a storage device, received in the bracket, and a wire is electronically connected to the storage device and the first circuit board; a clamping member located between the first circuit board and the motherboard; a supporting member located between the motherboard and the first circuit board; the supporting member comprising a clipping piece, a clamping member located between the supporting member and the first circuit board; the clamping member comprises a main body; and the main body abuts the clipping piece; and a cable, electronically connected to the first circuit board and clipped to the clamping member, comprising a connecting component and at least two connectors; wherein the connecting component is electronically connected to the first circuit board, and the at least two connectors are electronically connected to the at least two inserting slots; wherein the clamping member further comprises a clasping plate connected to the main body, and the main body and the clasping plate cooperatively define an accommodating space configured for positioning the cable.

7. The electronic device of claim 1, wherein a receiving hole is defined in the main body, and a clasping portion, engaged in the receiving hole, extends from the clasping plate.

8. The electronic device of claim 1, wherein the clamping member further comprises a mounting piece, and the supporting member is configured for being secured to the mounting piece.

9. The electronic device of claim 6, wherein a socket is defined in the first circuit board, and the connecting component is engaged in the socket.

10. The electronic device of claim 9, wherein an abutting piece is located above the socket, and the abutting piece abuts the connecting component.

* * * * *